US012217677B2

(12) United States Patent
Choi et al.

(10) Patent No.: US 12,217,677 B2
(45) Date of Patent: Feb. 4, 2025

(54) DISPLAY DEVICE, METHOD OF DRIVING DISPLAY DEVICE, AND ELECTRONIC APPARATUS INCLUDING DISPLAY DEVICE

(71) Applicant: Samsung Display Co., Ltd., Yongin-Si (KR)

(72) Inventors: Eunjin Choi, Yongin-si (KR); Geonhwi Park, Yongin-si (KR); Jang-Mi Lee, Yongin-si (KR); Kihyun Pyun, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/230,668

(22) Filed: Aug. 7, 2023

(65) Prior Publication Data

US 2024/0135865 A1 Apr. 25, 2024
US 2024/0233618 A9 Jul. 11, 2024

(30) Foreign Application Priority Data

Oct. 25, 2022 (KR) ........................ 10-2022-0138749

(51) Int. Cl.
*G09G 3/3233* (2016.01)
*G09G 3/32* (2016.01)

(52) U.S. Cl.
CPC ............. *G09G 3/3233* (2013.01); *G09G 3/32* (2013.01); *G09G 2320/0247* (2013.01); *G09G 2320/0673* (2013.01); *G09G 2330/021* (2013.01)

(58) Field of Classification Search
CPC ................... G09G 3/3233; G09G 3/32; G09G 2320/0247; G09G 2320/0673; G09G 2330/021
See application file for complete search history.

(56) References Cited

U.S. PATENT DOCUMENTS

| | | | | |
|---|---|---|---|---|
| 5,956,014 | A | 9/1999 | Kuriyama et al. | |
| 6,794,824 | B2 * | 9/2004 | Song | G09G 3/2944 345/63 |
| 7,304,654 | B2 * | 12/2007 | Mori | G09G 5/04 345/77 |

(Continued)

FOREIGN PATENT DOCUMENTS

| | | |
|---|---|---|
| KR | 10-0251624 B1 | 4/2000 |
| KR | 10-2021-0036602 A | 4/2021 |

*Primary Examiner* — Michael J Jansen, II
(74) *Attorney, Agent, or Firm* — Innovation Counsel LLP

(57) ABSTRACT

A display device includes a display panel displaying an image based on output image data, a voltage curve controller generating a converted peak luminance, a converted full white luminance, a converted peak grayscale, and a converted full white grayscale from a reference peak luminance and a reference full white luminance based on a gain mode and a gain value, and generating converted voltage curves including a first converted voltage curve from a first reference voltage curve based on the converted peak grayscale and the converted full white grayscale, and a driving voltage controller generating a driving voltage from the converted voltage curves based on a load and a maximum grayscale value of input image data. A voltage of the first converted voltage curve with respect to a peak grayscale is equal to a voltage of the first reference voltage curve with respect to the converted peak grayscale.

20 Claims, 9 Drawing Sheets

(56) References Cited

U.S. PATENT DOCUMENTS

| | | | | |
|---|---|---|---|---|
| 7,352,352 | B2 * | 4/2008 | Oh | G09G 3/3406 345/102 |
| 7,609,282 | B2 * | 10/2009 | Aoki | G09G 3/2003 345/698 |
| 8,111,915 | B2 * | 2/2012 | Cho | H04N 1/60 382/167 |
| 8,155,499 | B2 * | 4/2012 | Im | H04N 21/4312 348/634 |
| 8,836,734 | B2 * | 9/2014 | Mori | G09G 3/3208 348/173 |
| 8,896,641 | B2 * | 11/2014 | Kim | G09G 3/3233 345/694 |
| 9,087,485 | B2 * | 7/2015 | Ahn | G09G 3/3426 |
| 9,881,558 | B2 * | 1/2018 | Lee | G09G 3/20 |
| 9,990,878 | B2 * | 6/2018 | Heo | G09G 3/2003 |
| 10,127,857 | B2 * | 11/2018 | Lee | G01K 7/427 |
| 10,152,924 | B2 * | 12/2018 | Kim | G09G 3/3291 |
| 10,297,231 | B2 * | 5/2019 | Sako | G06T 5/90 |
| 10,417,973 | B2 * | 9/2019 | Kawaguchi | G09G 3/3406 |
| 10,497,304 | B2 * | 12/2019 | Yano | G09G 3/3208 |
| 10,510,292 | B2 * | 12/2019 | Jang | G09G 3/3258 |
| 10,699,674 | B2 * | 6/2020 | Jeong | G09G 3/3208 |
| 10,991,317 | B2 * | 4/2021 | Byun | G09G 3/3233 |
| 11,030,957 | B2 * | 6/2021 | Kim | H10K 59/131 |
| 11,069,293 | B2 * | 7/2021 | Ishii | G09G 3/3258 |
| 11,107,403 | B2 * | 8/2021 | Kato | G09G 3/3233 |
| 11,127,345 | B1 * | 9/2021 | Seo | G09G 3/2003 |
| 11,189,226 | B2 * | 11/2021 | Pyun | G09G 3/3233 |
| 11,189,234 | B2 * | 11/2021 | Pyun | G09G 3/3275 |
| 11,322,116 | B2 * | 5/2022 | Lim | G09G 5/10 |
| 11,450,260 | B2 * | 9/2022 | Park | G09G 3/2007 |
| 11,538,423 | B2 * | 12/2022 | Kim | G09G 3/3233 |
| 11,605,338 | B2 * | 3/2023 | Choi | G09G 3/2007 |
| 11,817,029 | B2 * | 11/2023 | Pyun | G09G 3/2007 |
| 11,842,686 | B2 * | 12/2023 | Kim | G09G 3/3233 |
| 11,881,152 | B2 * | 1/2024 | Pyun | G09G 3/32 |
| 11,881,165 | B2 * | 1/2024 | Pyun | G09G 3/3233 |
| 2003/0218432 | A1 * | 11/2003 | Song | G09G 3/2944 315/169.1 |
| 2005/0083268 | A1 * | 4/2005 | Mori | G09G 5/04 345/76 |
| 2005/0140640 | A1 * | 6/2005 | Oh | G09G 3/3406 345/102 |
| 2005/0190300 | A1 * | 9/2005 | Aoki | H04N 5/57 348/625 |
| 2007/0014541 | A1 * | 1/2007 | Im | H04N 21/8153 348/E5.122 |
| 2009/0022395 | A1 * | 1/2009 | Cho | G09G 5/06 382/167 |
| 2011/0141166 | A1 * | 6/2011 | Ahn | G09G 3/3426 345/691 |
| 2011/0298818 | A1 * | 12/2011 | Mori | G09G 3/3208 345/589 |
| 2012/0306947 | A1 * | 12/2012 | Kim | G09G 3/3233 345/694 |
| 2014/0176620 | A1 * | 6/2014 | Yano | G09G 3/3208 345/77 |
| 2015/0310808 | A1 * | 10/2015 | Lee | G09G 3/2007 345/77 |
| 2016/0140924 | A1 * | 5/2016 | Heo | G09G 3/2003 345/88 |
| 2016/0379555 | A1 * | 12/2016 | Kim | G09G 3/3291 345/691 |
| 2017/0206834 | A1 * | 7/2017 | Lee | G09G 3/3258 |
| 2018/0040282 | A1 * | 2/2018 | Kawaguchi | G09G 3/3611 |
| 2018/0061368 | A1 * | 3/2018 | Sako | G09G 3/342 |
| 2018/0122300 | A1 * | 5/2018 | Jang | G09G 3/3233 |
| 2019/0066593 | A1 * | 2/2019 | Ishii | G09G 3/3233 |
| 2019/0206364 | A1 * | 7/2019 | Jeong | G09G 3/2096 |
| 2020/0082761 | A1 * | 3/2020 | Kim | G09G 3/3233 |
| 2020/0143751 | A1 * | 5/2020 | Byun | G09G 3/3291 |
| 2020/0357344 | A1 * | 11/2020 | Pyun | G09G 3/3233 |
| 2021/0090499 | A1 * | 3/2021 | Kato | G09G 3/3233 |
| 2021/0166604 | A1 * | 6/2021 | Lim | G09G 3/2007 |
| 2021/0264877 | A1 * | 8/2021 | Pyun | G09G 3/3233 |
| 2021/0295767 | A1 * | 9/2021 | Seo | G09G 3/2003 |
| 2021/0327332 | A1 * | 10/2021 | Choi | G09G 3/3208 |
| 2021/0335273 | A1 * | 10/2021 | Meng | G09G 3/3208 |
| 2022/0084471 | A1 * | 3/2022 | Pyun | G09G 3/3233 |
| 2022/0148520 | A1 * | 5/2022 | Kim | G09G 3/2003 |
| 2022/0198998 | A1 * | 6/2022 | Park | G09G 3/2007 |
| 2022/0254300 | A1 * | 8/2022 | Pyun | G09G 3/3233 |
| 2023/0033713 | A1 * | 2/2023 | Pyun | G09G 3/2092 |
| 2023/0215355 | A1 * | 7/2023 | Kim | G09G 3/3208 345/691 |
| 2024/0078961 | A1 * | 3/2024 | Xin | G09G 3/32 |
| 2024/0135865 | A1 * | 4/2024 | Choi | G09G 3/32 |
| 2024/0153445 | A1 * | 5/2024 | Pyun | G09G 3/32 |
| 2024/0233618 | A9 * | 7/2024 | Choi | G09G 3/32 |

* cited by examiner

DISPLAY DEVICE, METHOD OF DRIVING DISPLAY DEVICE, AND ELECTRONIC APPARATUS INCLUDING DISPLAY DEVICE

CROSS-REFERENCE TO RELATED APPLICATION(S)

This application claims priority under 35 USC § 119 to Korean Patent Application No. 10-2022-0138749 filed on Oct. 25, 2022, in the Korean Intellectual Property Office (KIPO), the entire disclosure of which is incorporated by reference herein.

BACKGROUND

1. Field

Embodiments relate to a display device. More particularly, embodiments relate to a display device, a method of driving the display device, and an electronic apparatus including the display device.

2. Description of the Related Art

A display device may include a plurality of pixels. The display device may display an image using lights emitted from the pixels.

A driving voltage may be provided to the pixels to display an image, and the pixels may emit light with luminance corresponding to driving currents flowing through the pixels. In order to reduce power consumption of the display device, the driving currents flowing through the pixels and/or the driving voltage provided to the pixels may decrease.

When the magnitude of the driving voltage provided to the pixels changes, the luminance of the image displayed by the display device may change. When the luminance of the image changes, flicker may occur, and when the flicker is recognized, image quality of the display device may be degraded.

SUMMARY

Embodiments provide a display device for reducing power consumption and improving image quality, a method of driving the display device, and an electronic apparatus including the display device.

A display device according to embodiments may include a display panel which displays an image based on output image data which is converted input image data, a voltage curve controller which generates a converted peak luminance, a converted full white luminance, a converted peak grayscale corresponding to the converted peak luminance, and a converted full white grayscale corresponding to the converted full white luminance from a reference peak luminance and a reference full white luminance based on a gain mode and a gain value, and generates converted voltage curves including a first converted voltage curve from a first reference voltage curve based on the converted peak grayscale and the converted full white grayscale, and a driving voltage controller which generates a driving voltage from the converted voltage curves based on a load of the input image data and a maximum grayscale value of the input image data, and provides the driving voltage to the display panel. A voltage of the first converted voltage curve with respect to a peak grayscale may be equal to a voltage of the first reference voltage curve with respect to the converted peak grayscale.

In an embodiment, a voltage of the first converted voltage curve with respect to a full white grayscale may be equal to a voltage of the first reference voltage curve with respect to the converted full white grayscale.

In an embodiment, a ratio of the full white grayscale to the converted full white grayscale may be substantially equal to a ratio of the peak grayscale to the converted peak grayscale.

In an embodiment, voltages of the first converted voltage curve with respect to grayscales between the full white grayscale and the peak grayscale may be generated by interpolating the voltage of the first converted voltage curve with respect to the full white grayscale and the voltage of the first converted voltage curve with respect to the peak grayscale.

In an embodiment, a voltage of the first converted voltage curve with respect to a black grayscale may be equal to the voltage of the first converted voltage curve with respect to the peak grayscale.

In an embodiment, voltages of the first converted voltage curve with respect to grayscales between the black grayscale and the full white grayscale may be generated by interpolating the voltage of the first converted voltage curve with respect to the black grayscale and the voltage of the first converted voltage curve with respect to the full white grayscale.

In an embodiment, the black grayscale and the peak grayscale may be 0 grayscale and 255 grayscale, respectively.

In an embodiment, the converted peak luminance may be generated by multiplying the reference peak luminance by the gain value.

In an embodiment, the converted full white luminance may be equal to the reference full white luminance when the gain mode is a peak gain mode in which a luminance of the image decreases in a load range less than or equal to a predetermined load.

In an embodiment, the converted full white luminance may be generated by multiplying the reference full white luminance by the gain value when the gain mode is a dimming gain mode in which a luminance of the image decreases in an entire load range.

In an embodiment, each of the first reference voltage curve and the first converted voltage curve may represent a voltage with respect to a grayscale when the load of the input image data is a minimum load.

In an embodiment, the converted voltage curves may further include a second converted voltage curve representing a voltage with respect to a grayscale when the load of the input image data is a maximum load. The voltage curve controller may generate the second converted voltage curve based on the first converted voltage curve.

A method of driving a display device according to embodiments may include generating a converted peak luminance, a converted full white luminance, a converted peak grayscale corresponding to the converted peak luminance, and a converted full white grayscale corresponding to the converted full white luminance from a reference peak luminance and a reference full white luminance based on a gain mode and a gain value, generating converted voltage curves including a first converted voltage curve from a first reference voltage curve based on the converted peak grayscale and the converted full white grayscale, and generating a driving voltage from the converted voltage curves based on a load of input image data and a maximum grayscale value of the input image data. A voltage of the first converted voltage curve with respect to a peak grayscale may be equal to a voltage of the first reference voltage curve with respect to the converted peak grayscale.

In an embodiment, a voltage of the first converted voltage curve with respect to a full white grayscale may be equal to a voltage of the first reference voltage curve with respect to the converted full white grayscale.

In an embodiment, a ratio of the full white grayscale to the converted full white grayscale may be substantially equal to a ratio of the peak grayscale to the converted peak grayscale.

In an embodiment, voltages of the first converted voltage curve with respect to grayscales between the full white grayscale and the peak grayscale may be generated by interpolating the voltage of the first converted voltage curve with respect to the full white grayscale and the voltage of the first converted voltage curve with respect to the peak grayscale.

In an embodiment, a voltage of the first converted voltage curve with respect to a black grayscale may be equal to the voltage of the first converted voltage curve with respect to the peak grayscale.

In an embodiment, voltages of the first converted voltage curve with respect to grayscales between the black grayscale and the full white grayscale may be generated by interpolating the voltage of the first converted voltage curve with respect to the black grayscale and the voltage of the first converted voltage curve with respect to the full white grayscale.

An electronic apparatus according to embodiments may include a display device which outputs visual information and a processor which provides input image data to the display device. The display device may include a display panel which displays an image based on output image data which is converted input image data, a voltage curve controller which generates a converted peak luminance, a converted full white luminance, a converted peak grayscale corresponding to the converted peak luminance, and a converted full white grayscale corresponding to the converted full white luminance from a reference peak luminance and a reference full white luminance based on a gain mode and a gain value, and generates converted voltage curves including a first converted voltage curve from a first reference voltage curve based on the converted peak grayscale and the converted full white grayscale, and a driving voltage controller which generates a driving voltage from the converted voltage curves based on a load of the input image data and a maximum grayscale value of the input image data, and provides the driving voltage to the display panel. A voltage of the first converted voltage curve with respect to a peak grayscale may be equal to a voltage of the first reference voltage curve with respect to the converted peak grayscale.

In an embodiment, a voltage of the first converted voltage curve with respect to a full white grayscale may be equal to a voltage of the first reference voltage curve with respect to the converted full white grayscale.

In the display device, the method of driving the display device, and the electronic apparatus including the display device according to the embodiments, a converted peak grayscale and a converted full white grayscale may be generated based on a gain mode and a gain value, converted voltage curves may be generated from a first reference voltage curve based on the converted peak grayscale and the converted full white grayscale, and a driving voltage may be generated from the converted voltage curves, so that the driving voltage may decrease, and the change in driving voltage due to the change in image may decrease. Accordingly, power consumption of the display device may be reduced, and image quality of the display device may be improved.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF THE EMBODIMENTS

Figure 1:
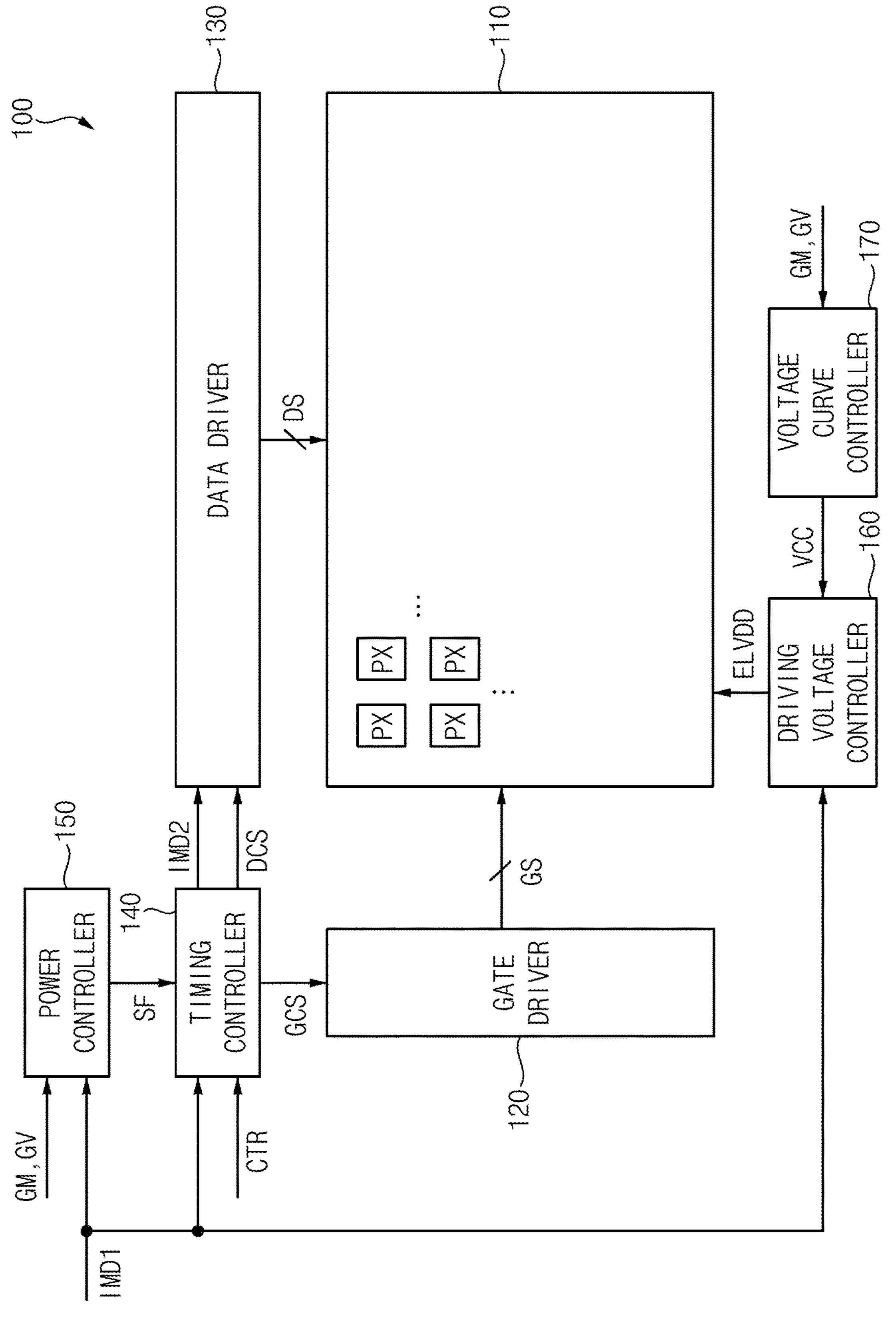
FIG. 1 is a block diagram illustrating a display device according to an embodiment.

Hereinafter, a display device, a method of driving a display device, and an electronic apparatus according to embodiments of the present disclosure will be described in more detail with reference to the accompanying drawings. The same or similar reference numerals will be used for the same elements in the accompanying drawings.

FIG. 1 is a block diagram illustrating a display device 100 according to an embodiment.

Referring to FIG. 1, the display device 100 may include a display panel 110, a gate driver 120, a data driver 130, a timing controller 140, a power controller 150, a driving voltage controller 160, and a voltage curve controller 170.

The display panel 110 may display an image based on output image data IMD2. The display panel 110 may include various display elements such as an organic light emitting diode ("OLED") or the like. Hereinafter, the display panel 110 including the organic light emitting diode as a display element will be described for convenience. However, the present disclosure is not limited thereto, and the display panel 110 may include various display elements such as a liquid crystal display ("LCD") element, an electrophoretic display ("EPD") element, an inorganic light emitting diode, a quantum dot light emitting diode, or the like.

The display panel 110 may include a plurality of pixels PX. Each of the pixels PX may be electrically connected to a data line and a gate line. Further, each of the pixels PX may be electrically connected to a driving voltage line and a common voltage line. Each of the pixels PX may emit light with a luminance corresponding to a data signal DS in response to a gate signal GS. The pixel PX will be described with reference to FIG. 2.

The gate driver 120 may generate the gate signals GS based on a gate control signal GCS, and may provide the gate signals GS to the display panel 110. The gate control signal GCS may include a gate start signal, a gate clock signal, or the like. The gate driver 120 may sequentially generate the gate signals GS in response to the gate start signal based on the gate clock signal.

The data driver 130 may generate the data signals DS based on the output image data IMD2 and a data control signal DCS, and may provide the data signals DS to the display panel 110. The output image data IMD2 may include grayscale values respectively corresponding to the pixels PX. The data control signal DCS may include a data start signal, a data clock signal, or the like.

The timing controller 140 may control a driving of the gate driver 120 and a driving of the data driver 130. The timing controller 140 may generate the output image data IMD2, the gate control signal GCS, and the data control signal DCS based on input image data IMD1, a scale factor SF, and a control signal CTR. The input image data IMD1 may include grayscale values respectively corresponding to the pixels PX. The control signal CTR may include a vertical synchronization signal, a horizontal synchronization signal, a clock signal, a data enable signal, or the like.

The timing controller 140 may convert the input image data IMD1 into the output image data IMD2 using the scale factor SF. In an embodiment, the timing controller 140 may generate the output image data IMD2 by scaling the grayscale values included in the input image data IMD1 using the scale factor SF.

The power controller 150 may generate a load of the input image data IMD1, and may generate the scale factor SF from a grayscale curve generated based on a gain mode GM and a gain value GV. The power controller 150 may provide the scale factor SF to the timing controller 140. The power controller 150 will be described with reference to FIGS. 3 to 6.

The driving voltage controller 160 may generate a driving voltage ELVDD from converted voltage curves VCC based on the load of the input image data IMD1 and a maximum grayscale value of the input image data IMD1, and may provide the driving voltage ELVDD to the display panel 110. The driving voltage controller 160 will be described with reference to FIG. 7.

The voltage curve controller 170 may generate the converted voltage curves VCC based on the gain mode GM and the gain value GV, and may provide the converted voltage curves VCC to the driving voltage controller 160. The voltage curve controller 170 will be described with reference to FIGS. 10 to 12.

Figure 2:
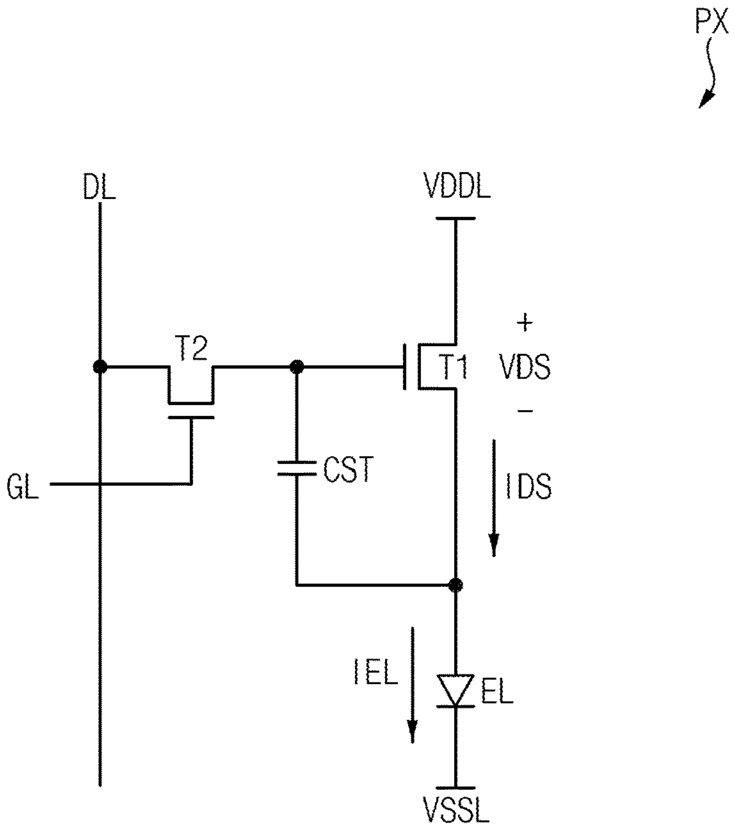
FIG. 2 is a circuit diagram illustrating a pixel according to an embodiment.

FIG. 2 is a circuit diagram illustrating the pixel PX according to an embodiment.

Referring to FIG. 2, the pixel PX may include a first transistor T1, a second transistor T2, a storage capacitor CST, and a light emitting diode EL.

The first transistor T1 may provide a driving current IEL to the light emitting diode EL. A first electrode of the first transistor T1 may be connected to the driving voltage line VDDL, and a second electrode of the first transistor T1 may be connected to a first electrode of the light emitting diode EL. A gate electrode of the first transistor T1 may be connected to a second electrode of the second transistor T2.

The second transistor T2 may provide the data signal DS to the first transistor T1. A first electrode of the second transistor T2 may be connected to the data line DL, and the second electrode of the second transistor T2 may be connected to the gate electrode of the first transistor T1. A gate electrode of the second transistor T2 may be connected to the gate line GL.

FIG. 2 illustrates an embodiment in which each of the first transistor T1 and the second transistor T2 is an N-type transistor, but the present disclosure is not limited thereto. In another embodiment, at least one of the first transistor T1 and the second transistor T2 may be a P-type transistor.

The storage capacitor CST may store the data signal DS. A first electrode of the storage capacitor CST may be connected to the second electrode of the first transistor T1, and a second electrode of the storage capacitor CST may be connected to the gate electrode of the first transistor T1.

FIG. 2 illustrates an embodiment in which the pixel PX includes two transistors T1 and T2 and one capacitor CST, but the present disclosure is not limited thereto. In another embodiment, the pixel PX may include three or more transistors and two or more capacitors.

The light emitting diode EL may emit light based on the driving current IEL. The first electrode of the light emitting diode EL may be connected to the second electrode of the first transistor T1, and a second electrode of the light emitting diode EL may be connected to the common voltage line VSSL.

When the first transistor T1 operates in a saturation region, a current IDS flowing through the first transistor T1 may be proportional to a voltage difference VDS between the first electrode and the second electrode of the first transistor T1. The voltage difference VDS between the first electrode and the second electrode of the first transistor T1 may be equal to a voltage difference between the driving voltage ELVDD and a voltage of the first electrode of the light emitting diode EL, and the current IDS flowing through the first transistor T1 may be equal to the driving current IEL. Accordingly, although a voltage difference VGS between the gate electrode and the second electrode of the first transistor T1 maintains, the luminance of the pixel PX may increase as the driving current IEL increases when the driving voltage ELVDD increases, and the luminance of the pixel PX may decrease as the driving current IEL decreases when the driving voltage ELVDD decreases.

Figure 3:
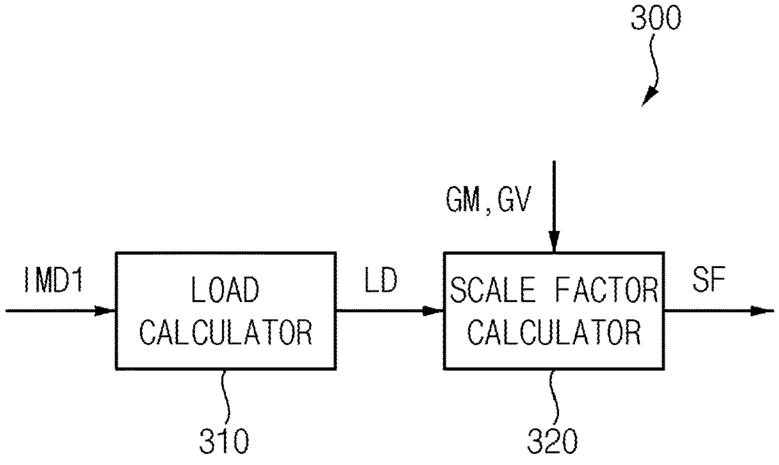
FIG. 3 is a block diagram illustrating a power controller according to an embodiment.

FIG. 3 is a block diagram illustrating a power controller 300 according to an embodiment. The power controller 300 in FIG. 3 may correspond to the power controller 150 included in the display device 100 in FIG. 1.

Referring to FIG. 3, the power controller 150 may include a load calculator 310 and a scale factor calculator 320.

The load calculator 310 may generate the load LD of the input image data IMD1 from the input image data IMD1. The load LD of the input image data IMD1 may be a ratio of an average of the grayscale values included in the input image data IMD1 to a peak grayscale (or a maximum grayscale). In an embodiment, when the input image data IMD1 represents a grayscale using 8 bits, a black grayscale (or a minimum grayscale) may be 0 grayscale, and the peak grayscale may be 255 grayscale. In an embodiment, the load LD of the input image data IMD1 may be 0% when each of the grayscale values included in the input image data IMD1 is the black grayscale, and the load LD of the input image data IMD1 may be 100% when each of the grayscale values included in the input image data IMD1 is the peak grayscale.

The scale factor calculator 320 may generate the scale factor SF from the grayscale curve generated based on the gain mode GM and the gain value GV according to the load LD of the input image data IMD1. The scale factor calculator 320 may generate the scale factor SF from a grayscale of the grayscale curve with respect to the load LD of the input image data IMD1. The gain mode GM may include a peak gain mode and a dimming gain mode. The peak gain mode may be a gain mode in which luminance of an image decreases in a load range less than or equal to a predetermined load, and the dimming gain mode may be a gain mode in which luminance of an image decreases in an entire load range. In the peak gain mode, the grayscale curve may be controlled so that the luminance of the image decreases in the load range less than or equal to the predetermined load. In the dimming gain mode, the grayscale curve may be controlled so that the luminance of the image decreases in the entire load range.

Figure 4:
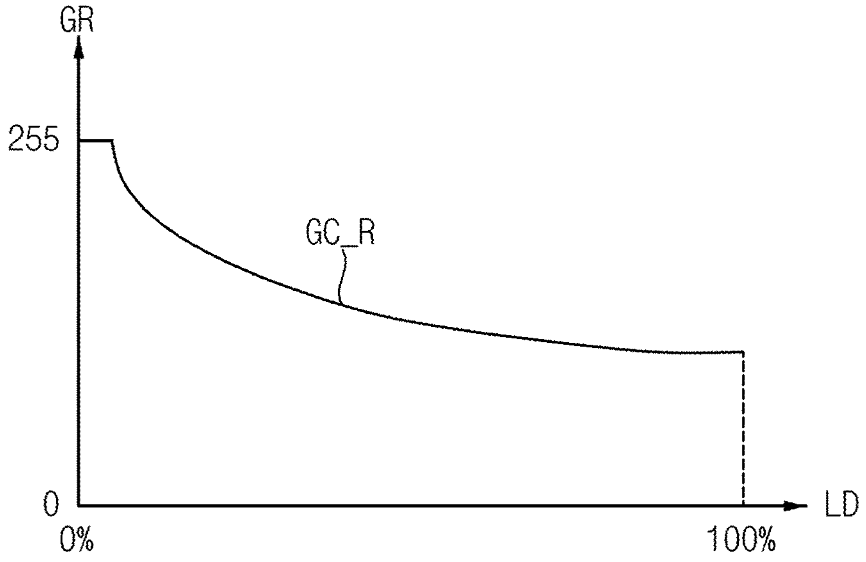
FIG. 4 is a graph illustrating a reference grayscale curve according to an embodiment.

FIG. 4 is a graph illustrating a reference grayscale curve GC_R according to an embodiment.

Referring to FIG. 4, the reference grayscale curve GC_R may represent a grayscale GR with respect to the load LD of the input image data IMD1. A grayscale curve may be generated by applying the gain value GV according to the gain mode GM to the reference grayscale curve GC_R. In the reference grayscale curve GC_R, the grayscale GR may decrease as the load LD of the input image data IMD1 increases. For example, the grayscale GR may be 255 grayscale when the load LD of the input image data IMD1 is 0%, and the grayscale GR may be less than or equal to 255 grayscale when the load LD of the input image data IMD1 is greater than 0%.

Figure 5:
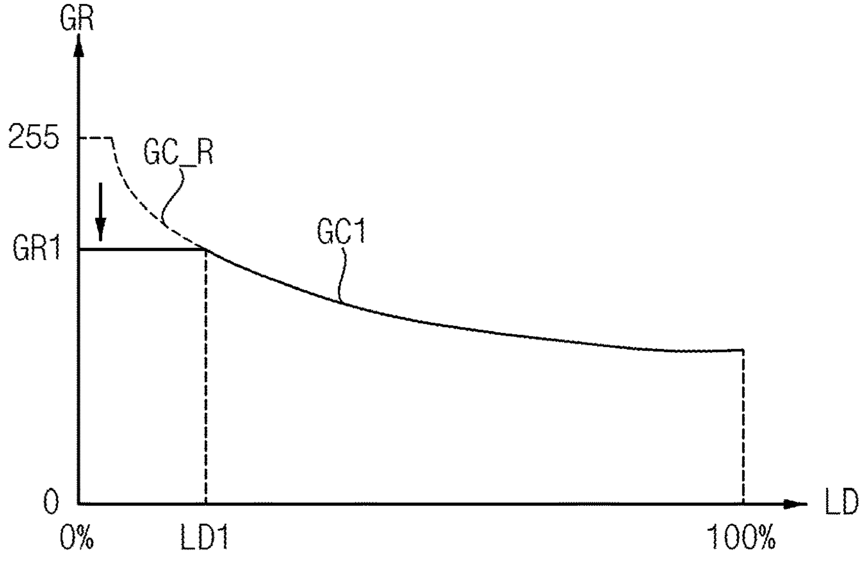
FIG. 5 is a graph illustrating a first grayscale curve in a peak gain mode according to an embodiment.

FIG. 5 is a graph illustrating a first grayscale curve GC1 in the peak gain mode according to an embodiment.

Referring to FIG. 5, when the gain mode GM is the peak gain mode, the first grayscale curve GC1 may be generated by converting grayscales GR greater than a first grayscale GR1 in the reference grayscale curve GC_R into the first grayscale GR1. The first grayscale GR1 may be a grayscale corresponding to a luminance obtained by multiplying an initially set reference peak luminance by the gain value GV. The grayscale GR of the first grayscale curve GC1 with respect to the load LD between 0% and a first load LD1 may be the first grayscale GR1, and the grayscale GR of the first grayscale curve GC1 with respect to the load LD greater than the first load LD1 may be less than the first grayscale GR1. For example, when the reference peak luminance is about 1500 nit and the gain value GV is 400/1024, the first grayscale GR1 may be 166 grayscale corresponding to about 586 (=1500*(400/1024)) nit.

Figure 6:
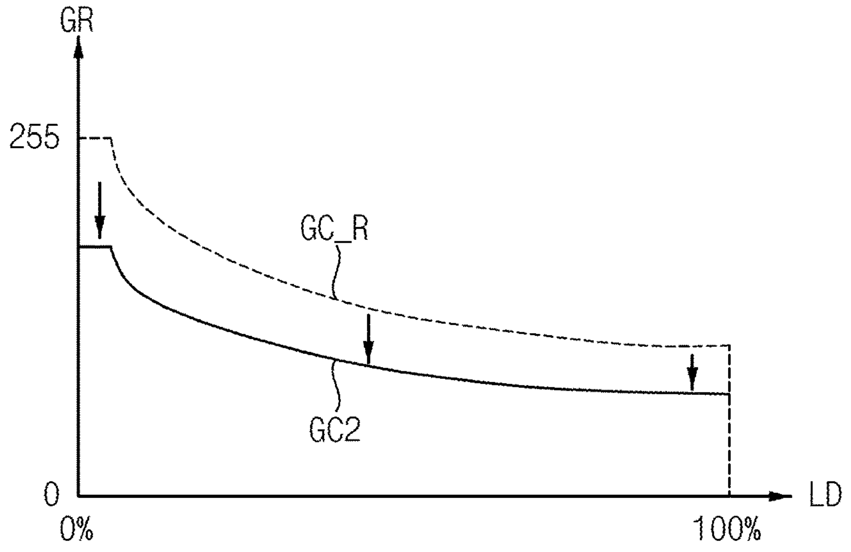
FIG. 6 is a graph illustrating a second grayscale curve in a dimming gain mode according to an embodiment.

FIG. 6 is a graph illustrating a second grayscale curve GC2 in the dimming gain mode according to an embodiment.

Referring to FIG. 6, when the gain mode GM is the dimming gain mode, the second grayscale curve GC2 may be generated by decreasing grayscales GR with respect to the entire load range in the reference grayscale curve GC_R by a ratio corresponding to the gain value GV. For example, when the gain value GV is 400/1024, the grayscales GR of the second grayscale curve GC2 may decrease by a ratio corresponding to 400/1024 of the reference grayscale curve GC_R in the entire load range.

Figure 7:
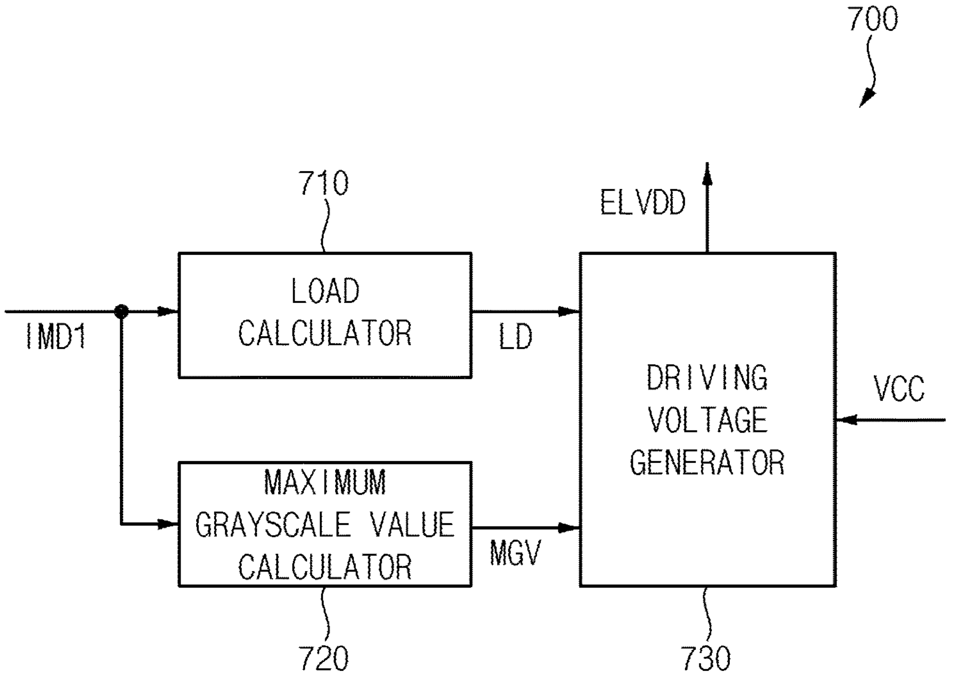
FIG. 7 is a block diagram illustrating a driving voltage controller according to an embodiment.

FIG. 7 is a block diagram illustrating a driving voltage controller 700 according to an embodiment. The driving voltage controller 700 in FIG. 7 may correspond to the driving voltage controller 160 included in the display device 100 in FIG. 1.

Referring to FIG. 7, the driving voltage controller 700 may include a load calculator 710, a maximum grayscale value calculator 720, and a driving voltage generator 730.

The load calculator 710 may generate the load LD of the input image data IMD1 from the input image data IMD1.

The maximum grayscale value calculator 720 may generate the maximum grayscale value MGV of the input image data IMD1 from the input image data IMD1. The maximum grayscale value MGV of the input image data IMD1 may be the highest grayscale value among the grayscale values included in the input image data IMD1 in one frame.

The driving voltage generator 730 may generate the driving voltage ELVDD from the converted voltage curves VCC based on the load LD of the input image data IMD1 and the maximum grayscale value MGV of the input image data IMD1. Each of the converted voltage curves VCC may represent a voltage with respect to a grayscale. One converted voltage curve may be selected from the converted voltage curves VCC based on the load LD of the input image data IMD1, and one point may be selected from points of the selected converted voltage curve based on the maximum grayscale value MGV of the input image data IMD1. The driving voltage generator 730 may determine a voltage corresponding to the selected point as the driving voltage ELVDD, and may provide the determined driving voltage ELVDD to the display panel 110.

The voltage curve controller 170 may provide the converted voltage curves VCC to the driving voltage controller 700, and the driving voltage controller 700 may generate the driving voltage ELVDD from the converted voltage curves VCC based on the input image data IMD1, so that the driving voltage ELVDD may be adjusted in consideration of the load LD and the maximum grayscale value MGV of the input image data IMD1. Accordingly, the driving voltage ELVDD provided to the pixels PX may decrease, and power consumption of the display device 100, which is proportional to the sum of the driving currents IEL flowing through the pixels PX and the driving voltage ELVDD, may be reduced.

Figure 8:
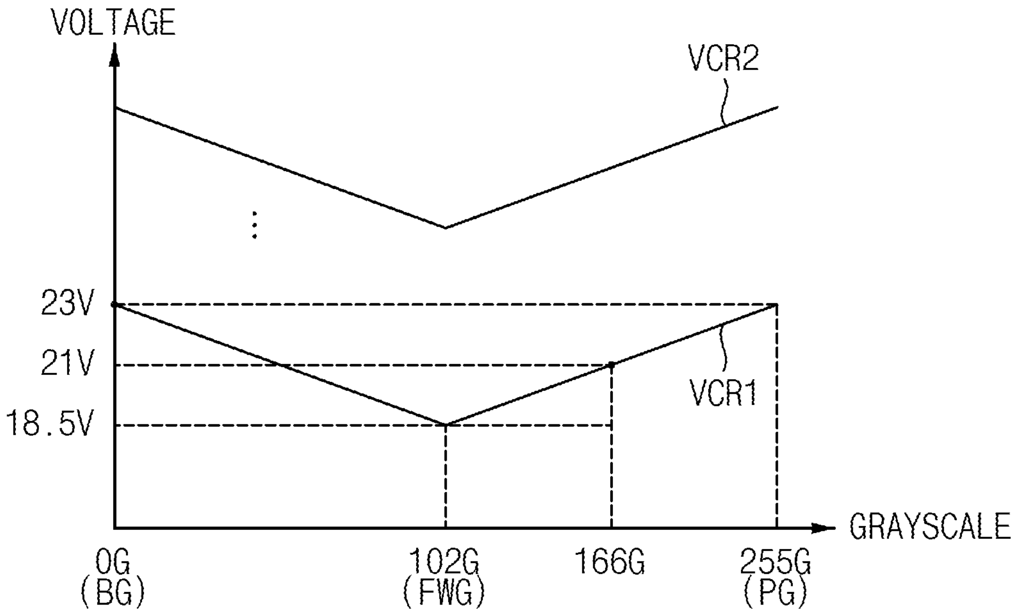
FIG. 8 is a graph illustrating reference voltage curves according to an embodiment.

FIG. 8 is a graph illustrating reference voltage curves VCR1, . . . , VCR2 according to an embodiment.

Referring to FIG. 8, each of the reference voltage curves VCR1, . . . , VCR2 may represent a voltage with respect to a grayscale. The reference voltage curves may include a first reference voltage curve VCR1, a second reference voltage curve VCR2, or the like. The first reference voltage curve VCR1 may represent a voltage with respect to a grayscale when the load of image data is the minimum load (e.g., 0%). The second reference voltage curve VCR2 may represent a voltage with respect to a grayscale when the load of image data is the maximum load (e.g., 100%). Although not illustrated in FIG. 8, the reference voltage curves VCR1, . . . , VCR2 may further include additional reference voltage curves between the first reference voltage curve VCR1 and the second reference voltage curve VCR2. Each of the additional reference voltage curves may represent a voltage with respect to a grayscale when the load of image data is greater than the minimum load and less than the maximum load.

Since a voltage drop amount of the driving voltage ELVDD increases as the load of image data increases, the voltage of the reference voltage curve may increase as the load of image data increases. Further, since a luminance of the pixel PX to which the data signal DS corresponding to the maximum grayscale value is applied increases as the maximum grayscale value of the image data increases, the voltage of each of the reference voltage curves VCR1, . . . , VCR2 may increase from a full white grayscale FWG to the peak grayscale PG. Further, in order to prevent an increase in background luminance due to a change in image, the voltage of each of the reference voltage curves VCR1, . . . , VCR2 may decrease from the black grayscale BG to the full white grayscale FWG. Accordingly, the voltage of each of the reference voltage curves VCR1, . . . , VCR2 may decrease from the black grayscale BG to the full white grayscale FWG, and may increase from the full white grayscale FWG to the peak grayscale PG. In an embodiment, the black grayscale BG and the peak grayscale PG may be 0 grayscale and 255 grayscale, respectively, and the full white grayscale FWG may be a grayscale between the black grayscale BG and the peak grayscale PG.

Figure 9:
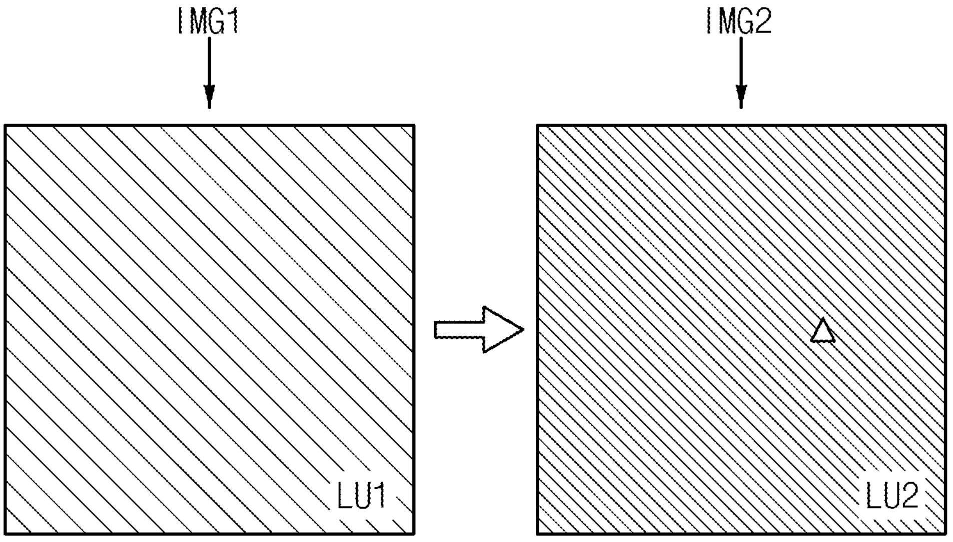
FIG. 9 is a diagram for describing a change in luminance due to a change in image according to a comparative example.

FIG. 9 is a diagram for describing a change in luminance due to a change in image according to a comparative example.

Referring to FIGS. 8 and 9, in a comparative example of the present disclosure, a driving voltage controller may generate a driving voltage ELVDD from the reference voltage curves VCR1, . . . , VCR2 based on a load and a maximum grayscale value of the output image data IMD2. When a first image IMG1 is displayed in a first frame period and a second image IMG2 is displayed in a second frame period after the first frame period, the driving voltage controller may generate the driving voltage ELVDD in the first and second frame periods from the reference voltage curves VCR1, . . . , VCR2 based on the load and maximum grayscale value of the output image data IMD2 corresponding to the first and second images IMG1 and IMG2. For example, the first image IMG1 may be a background image of 16 grayscale, and the second image IMG2 may be an image in which a small triangle of 255 grayscale is displayed on a background of 16 grayscale.

In the comparative example, the scale factor SF may be generated based on the gain mode GM and the gain value GV, and the input image data IMD1 may be converted into the output image data IMD2 using the scale factor SF. For example, when the gain mode GM is the peak gain mode and the gain value GV is 400/1024, the maximum grayscale value of image data corresponding to the first image IMG1 may decrease from 16 grayscale to 13 grayscale, and the maximum grayscale value of image data corresponding to the second image IMG2 may decrease from 255 grayscale to 166 grayscale. In other words, the maximum grayscale value of the output image data IMD2 corresponding to the first image IMG1 may be 13 grayscale, and the maximum grayscale value of the output image data IMD2 corresponding to the second image IMG2 may be 166 grayscale.

Since the load of the output image data IMD2 corresponding to the first image IMG1 and the load of the output image data IMD2 corresponding to the second image IMG2 are relatively small, the first reference voltage curve VCR1 may be selected from the reference voltage curves VCR1, . . . , VCR2. Further, since the maximum grayscale value of the output image data IMD2 corresponding to the first image IMG1 is 13 grayscale and the maximum grayscale value of the output image data IMD2 corresponding to the second image IMG2 is 166 grayscale, the driving voltage (e.g., about 21V) generated in the second frame period displaying the second image IMG2 may be less than the driving voltage (e.g., about 23V) generated in the first frame period displaying the first image IMG1. In this case, since the driving voltages ELVDD provided to the pixel PX during the first frame period and the second frame period are different although the data signal DS provided to the pixel PX are the same in the first frame period and the second frame period, a second luminance LU2 of the background of the second image IMG2 may be less than a first luminance LU1 of the background of the first image IMG1. A decrease in background luminance (LU1→LU2) due to the change in image (IMG1→IMG2) may be recognized as a flicker, and accordingly, image quality of the display device 100 may be degraded.

Figure 10:
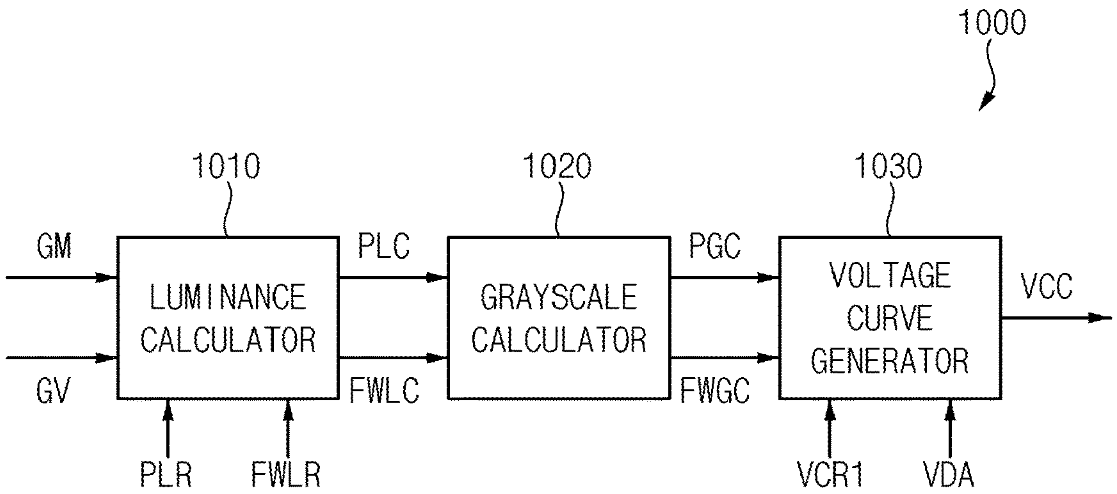
FIG. 10 is a block diagram illustrating a voltage curve controller according to an embodiment.

FIG. 10 is a block diagram illustrating a voltage curve controller 1000 according to an embodiment. The voltage curve controller 1000 in FIG. 10 may correspond to the voltage curve controller 170 included in the display device 100 in FIG. 1.

Referring to FIG. 10, the voltage curve controller 1000 may include a luminance calculator 1010, a grayscale calculator 1020, and a voltage curve generator 1030.

The luminance calculator 1010 may generate a converted peak luminance PLC and a converted full white luminance FWLC from a reference peak luminance PLR and a reference full white luminance FWLR based on the gain mode GM and the gain value GV. The converted peak luminance PLC may be generated by multiplying the reference peak luminance PLR by the gain value GV. For example, when the reference peak luminance PLR is about 1500 nit and the gain value GV is 400/1024, the luminance calculator 1010 may generate the converted peak luminance PLC as about 586 (=1500*(400/1024)) nit.

When the gain mode GM is the peak gain mode, the converted full white luminance FWLC may be equal to the reference full white luminance FWLR. When the gain mode GM is the dimming gain mode, the converted full white luminance FWLC may be generated by multiplying the reference full white luminance FWLR by the gain value GV. For example, when the reference full white luminance FWLR is about 200 nit and the gain value GV is 400/1024, the converted full white luminance FWLC may be about 200 nit in the peak gain mode, and the luminance calculator 1010 may generate the converted full white luminance FWLC as about 78 (=200*(400/1024)) nit in the dimming gain mode.

The grayscale calculator 1020 may respectively convert the converted peak luminance PLC and the converted full white luminance FWLC into a converted peak grayscale PGC and a converted full white grayscale FWGC, respectively. The grayscale calculator 1020 may generate a grayscale at which the converted peak luminance PLC is output as the converted peak grayscale PGC, and may generate a grayscale at which the converted full white luminance FWLC is output as the converted full white grayscale FWGC. For example, when the converted peak luminance PLC is about 586 nit, the grayscale calculator 1020 may generate the converted peak grayscale PGC as 166 grayscale. For example, the grayscale calculator 1020 may generate the converted full white luminance FWGC as 102 grayscale when the converted full white luminance FWLC is about 200 nit, and the grayscale calculator 1020 may generate the converted full white grayscale FWGC as 66 grayscale when the converted full white luminance FWLC is about 78 nit.

The voltage curve generator 1030 may generate the converted voltage curves VCC based on the converted peak grayscale PGC, the converted full white grayscale FWGC, the first reference voltage curve VCR1, and a voltage drop amount VDA.

Figure 11:
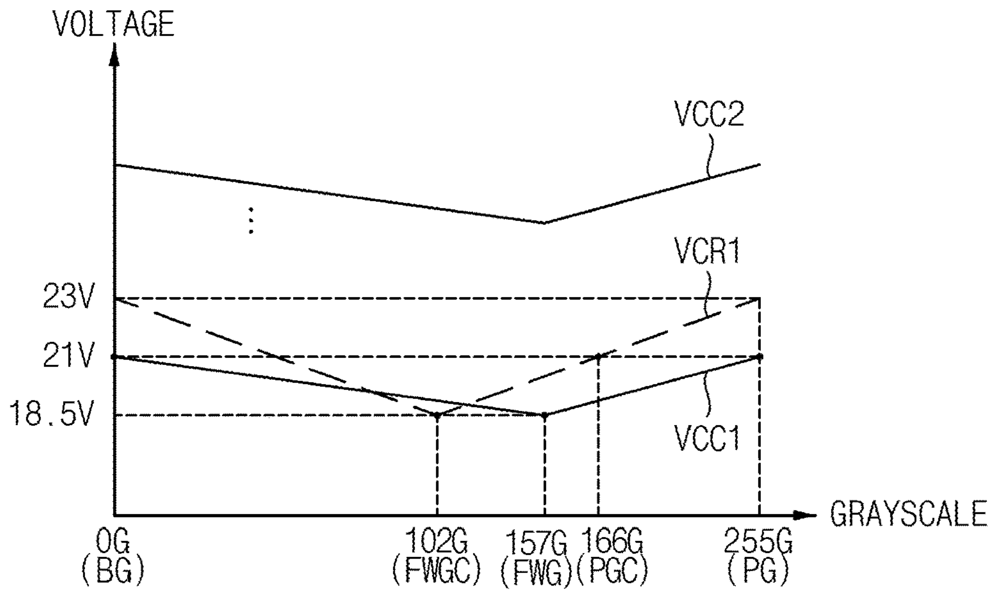
FIG. 11 is a graph illustrating converted voltage curves in a peak gain mode according to an embodiment.
Figure 12:
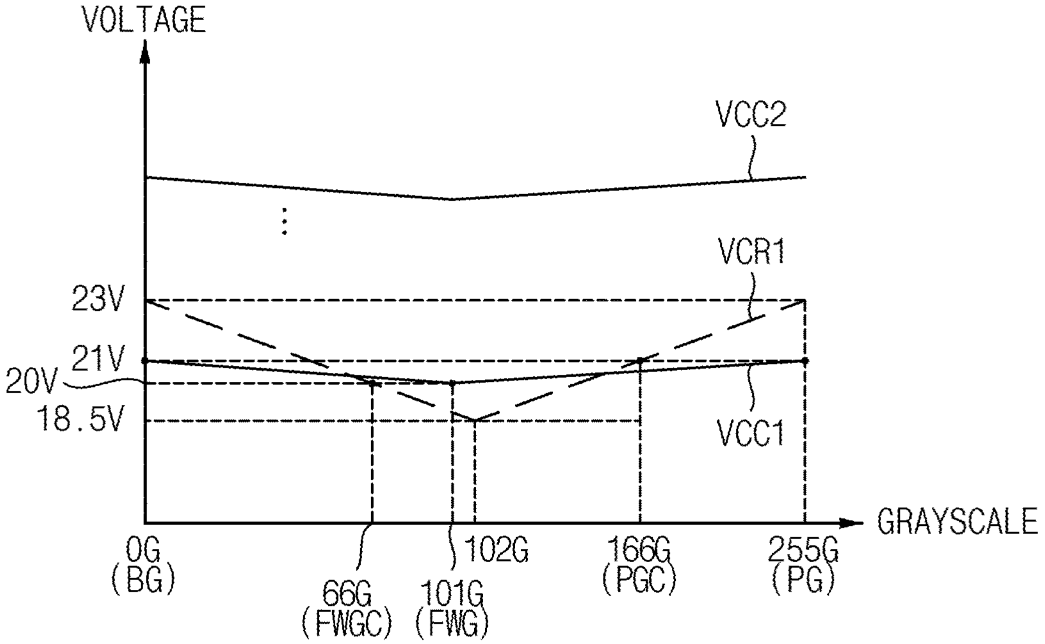
FIG. 12 is a graph illustrating converted voltage curves in a dimming gain mode according to an embodiment.

FIG. 11 is a graph illustrating converted voltage curves VCC1, . . . , VCC2 in the peak gain mode according to an embodiment. FIG. 12 is a graph illustrating converted voltage curves VCC1, . . . , VCC2 in the dimming gain mode according to an embodiment.

Referring to FIGS. 11 and 12, the voltage curve generator 1030 may generate a first converted voltage curve VCC1 from the first reference voltage curve VCR1 based on the converted peak grayscale PGC and the converted full white grayscale FWGC. A voltage of the first converted voltage curve VCC1 with respect to the peak grayscale PG may be equal to a voltage of the first reference voltage curve VCR1 with respect to the converted peak grayscale PGC. For example, when the voltage of the first reference voltage curve VCR1 with respect to the converted peak grayscale PGC is about 21V, the voltage of the first converted voltage curve VCC1 with respect to the peak grayscale PG may be about 21V.

A voltage of the first converted voltage curve VCC1 with respect to the full white grayscale FWG may be equal to a voltage of the first reference voltage curve VCR1 with respect to the converted full white grayscale FWGC. For example, when the voltage of the first reference voltage curve VCR1 with respect to the converted full white grayscale FWGC is about 18.5V in the peak gain mode, the voltage of the first converted voltage curve VCC1 with respect to the full white grayscale FWG may be about 18.5V. For example, when the voltage of the first reference voltage curve VCR1 with respect to the converted full white grayscale FWGC is about 20V in the dimming gain mode, the voltage of the first converted voltage curve VCC1 with respect to the full white grayscale FWG may be about 20V.

A ratio of the full white grayscale FWG to the converted full white grayscale FWGC may be substantially equal to a ratio of the peak grayscale PG to the converted peak grayscale PGC. For example, in the peak gain mode, when the converted peak grayscale PGC is 166 grayscale, the peak grayscale PG is 255 grayscale and the converted full white grayscale FWGC is 102 grayscale, the full white grayscale FWG may be generated as 157 (=(255/166)*102) grayscale. For example, in the dimming gain mode, when the converted peak grayscale PGC is 166 grayscale, the peak grayscale PG is 255 grayscale, and the converted full white grayscale FWGC is 66 grayscale, the full white grayscale FWG may be generated as 101 (=(255/166)*66) grayscale.

Voltages of the first converted voltage curve VCC1 with respect to grayscales between the full white grayscale FWG and the peak grayscale PG may be generated by interpolating the voltage of the first converted voltage curve VCC1 with respect to the full white grayscale FWG and the voltage of the first converted voltage curve VCC1 with respect to peak grayscale PG. In an embodiment, the voltages of the first converted voltage curve VCC1 with respect to the grayscales between the full white grayscale FWG and the peak grayscale PG may linearly increase from the voltage of the first converted voltage curve VCC1 with respect to the full white grayscale FWG to the voltage of the first converted voltage curve VCC1 with respect to peak grayscale PG.

A voltage of the first converted voltage curve VCC1 with respect to the black grayscale BG may be equal to the voltage of the first converted voltage curve VCC1 with respect to the peak grayscale PG. For example, when the voltage of the first converted voltage curve VCC1 with respect to the peak grayscale PG is about 21V, the voltage of the first converted voltage curve VCC1 with respect to the black grayscale BG may be about 21V.

Voltages of the first converted voltage curve VCC1 with respect to grayscales between the black grayscale BG and the full white grayscale FWG may be generated by interpolating the voltage of the first converted voltage curve VCC1 with respect to the black grayscale BG and the voltage of the first converted voltage curve VCC1 with respect to the full white grayscale FWG. In an embodiment, the voltages of the first converted voltage curve VCC1 with respect to the grayscales between the black grayscale BG and the full white grayscale FWG may linearly decrease from the voltage of the first converted voltage curve VCC1 with respect to the black grayscale BG to the voltage of the first converted voltage curve VCC1 with respect to the full white grayscale FWG.

The voltage curve generator 1030 may generate a second converted voltage curve VCC2 and an additional converted voltage curves between the first converted voltage curve VCC1 and the second converted voltage curve VCC2 based on the first converted voltage curve VCC1. The first converted voltage curve VCC1 may represent a voltage with respect to a grayscale when the load LD of the input image data IMD1 is the minimum load (e.g., 0%), and the second converted voltage curve VCC2 may represent a voltage with respect to a grayscale when the load LD of the input image data IMD1 is the maximum load (e.g., 100%).

A voltage of the second converted voltage curve VCC2 with respect to the peak grayscale PG may be greater than the voltage of the first converted voltage curve VCC1 with respect to the peak grayscale PG by the voltage drop amount VDA of the driving voltage ELVDD corresponding to the converted peak luminance PLC. A voltage of the second converted voltage curve VCC2 with respect to the full white grayscale FWG may be greater than the voltage of the first converted voltage curve VCC1 with respect to the full white grayscale FWG by the voltage drop amount VDA of the driving voltage ELVDD corresponding to the converted full white luminance FWLC. A voltage of the second converted voltage curve VCC2 with respect to the black grayscale BG may be equal to the voltage of the second converted voltage curve VCC2 with respect to the peak grayscale PG. Voltages of the second converted voltage curve VCC2 with respect to grayscales between the full white grayscale FWG and the peak grayscale PG may be generated by interpolating the voltage of the second converted voltage curve VCC2 with respect to the full white grayscale FWG and the voltage of the second converted voltage curve VCC2 with respect to peak grayscale PG. Voltages of the second converted voltage curve VCC2 with respect to grayscales between the black grayscale BG and the full white grayscale FWG may be generated by interpolating the voltage of the second converted voltage curve VCC2 with respect to the black grayscale BG and the voltage of the second converted voltage curve VCC2 with respect to the full white grayscale FWG.

Figure 13:
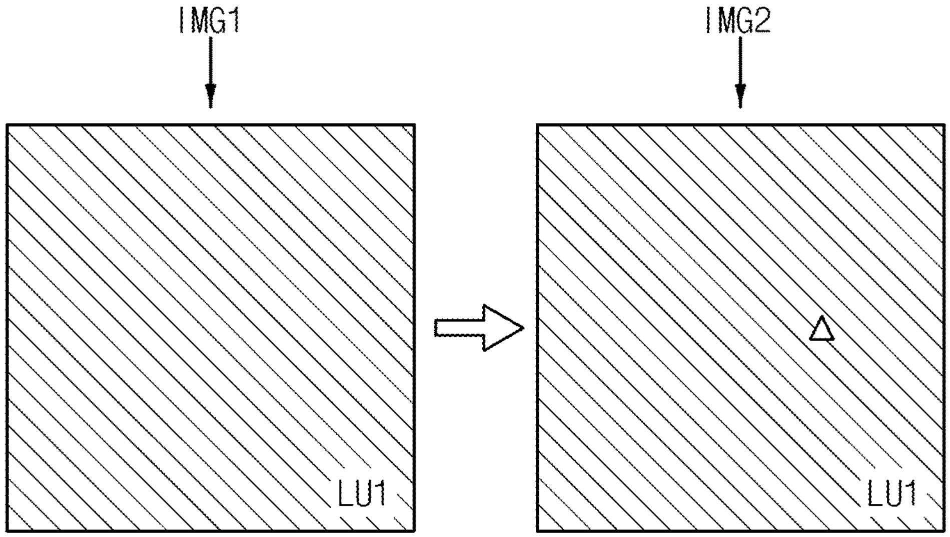
FIG. 13 is a diagram for describing a change in luminance due to a change in image according to an embodiment.

FIG. 13 is a diagram for describing a change in luminance due to a change in image according to an embodiment.

Referring to FIG. 13, in an embodiment of the present disclosure, the driving voltage controller 160 may generate the driving voltage ELVDD with reference to the converted voltage curves VCC1, . . . , VCC2 based on the load LD and the maximum grayscale value MGV of the input image data IMD1. When a first image IMG1 is displayed in a first frame period and a second image IMG2 is displayed in a second frame period after the first frame period, the driving voltage controller 160 may generate the driving voltage ELVDD in the first and second frame periods with reference to the converted voltage curves VCC1, . . . , VCC2 based on the load LD and maximum grayscale value MGV of the input image data IMD1 corresponding to the first and second images IMG1 and IMG2. For example, the first image IMG1 may be a background image of 16 grayscale, and the second image IMG2 may be an image in which a small triangle of 255 grayscale is displayed on a background of 16 grayscale.

Since the load LD of the input image data IMD1 corresponding to the first image IMG1 and the load LD of the input image data IMD1 corresponding to the second image IMG2 are relatively small, the first converted voltage curve VCC1 may be selected from the converted voltage curves VCC1, . . . , VCC2. Further, since the maximum grayscale value MGV of the input image data IMD1 corresponding to the first image IMG1 is 16 grayscale and the maximum grayscale value MGV of the input image data IMD1 corresponding to the second image IMG2 is 255 grayscale, a difference between the magnitude of the driving voltage ELVDD generated in the second frame period displaying the second image IMG2 and the magnitude of the driving voltage ELVDD generated in the first frame period displaying the first image IMG1 may be very small. In this case, since the difference in magnitude of the driving voltage ELVDD provided to the pixel PX are very small when the magnitudes of the data signals DS provided to the pixel PX are the same in the first and second frame periods, the first luminance LU1 of the background of the second image IMG2 may be substantially equal to the first luminance LU1 of the background of the first image IMG1. A change in background luminance due to the change in image (IMG1→IMG2) may not occur, and accordingly, the image quality of the display device 100 may be improved.

Figure 14:
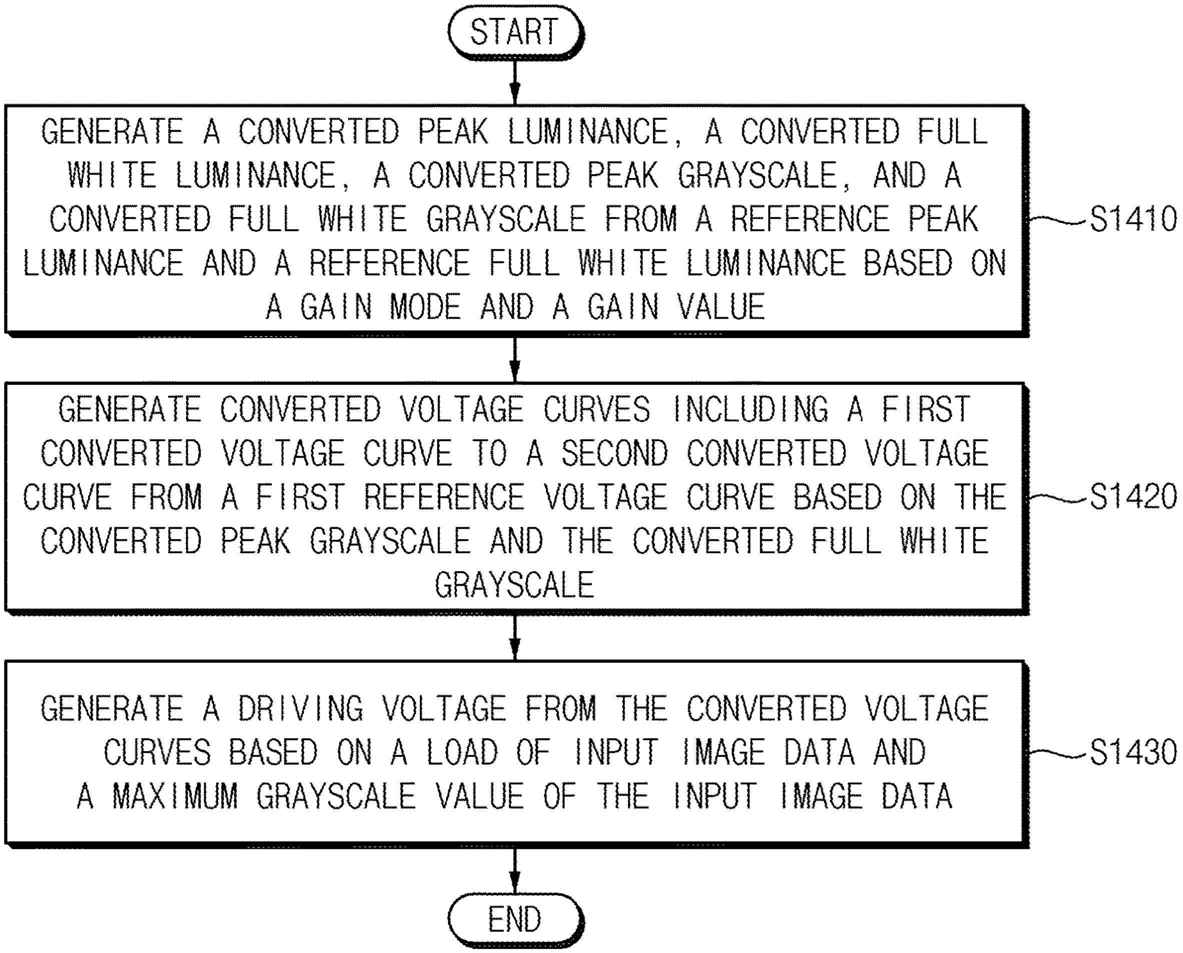
FIG. 14 is a flowchart illustrating a method of driving a display device according to an embodiment.

FIG. 14 is a flowchart illustrating a method of driving a display device according to an embodiment.

Referring to FIGS. 10 and 14, in the method of driving the display device, the voltage curve controller 1000 may generate the converted peak luminance PLC, the converted full white luminance FWLC, the converted peak grayscale PGC, and the converted full white grayscale FWGC from the reference peak luminance PLR and the reference full white luminance FWLR based on the gain mode GM and the gain value GV (S1410).

The luminance calculator 1010 may generate the converted peak luminance PLC and the converted full white luminance FWLC from the reference peak luminance PLR and the reference full white luminance FWLR based on the gain mode GM and the gain value GV. The converted peak luminance PLC may be generated by multiplying the reference peak luminance PLR by the gain value GV. When the gain mode GM is the peak gain mode, the converted full white luminance FWLC may be equal to the reference full white luminance FWLR. When the gain mode GM is the dimming gain mode, the converted full white luminance FWLC may be generated by multiplying the reference full white luminance FWLR by the gain value GV.

The grayscale calculator 1020 may respectively convert the converted peak luminance PLC and the converted full white luminance FWLC into the converted peak grayscale PGC and the converted full white grayscale FWGC. The grayscale calculator 1020 may generate a grayscale at which the converted peak luminance PLC is output as the converted peak grayscale PGC, and may generate a grayscale at which the converted full white luminance FWLC is output as the converted full white grayscale FWGC.

The voltage curve generator 1030 may generate the converted voltage curves VCC including the first converted voltage curve VCC1 to the second converted voltage curve VCC2 from the first reference voltage curve VCR1 based on the converted peak grayscale PGC and the converted full white grayscale FWGC (S1420).

The voltage curve generator 1030 may generate the first converted voltage curve VCC1 from the first reference voltage curve VCR1 based on the converted peak grayscale PGC and the converted full white grayscale FWGC. A voltage of the first converted voltage curve VCC1 with respect to the peak grayscale PG may be equal to a voltage of the first reference voltage curve VCR1 with respect to the converted peak grayscale PGC.

A voltage of the first converted voltage curve VCC1 with respect to the full white grayscale FWG may be equal to a voltage of the first reference voltage curve VCR1 with respect to the converted full white grayscale FWGC. A ratio of the full white grayscale FWG to the converted full white grayscale FWGC may be substantially equal to a ratio of the peak grayscale PG to the converted peak grayscale PGC. Voltages of the first converted voltage curve VCC1 with respect to grayscales between the full white grayscale FWG and the peak grayscale PG may be generated by interpolating the voltage of the first converted voltage curve VCC1 with respect to the full white grayscale FWG and the voltage of the first converted voltage curve VCC1 with respect to peak grayscale PG.

A voltage of the first converted voltage curve VCC1 with respect to the black grayscale BG may be equal to the voltage of the first converted voltage curve VCC1 with respect to the peak grayscale PG. Voltages of the first converted voltage curve VCC1 with respect to grayscales between the black grayscale BG and the full white grayscale FWG may be generated by interpolating the voltage of the first converted voltage curve VCC1 with respect to the black grayscale BG and the voltage of the first converted voltage curve VCC1 with respect to the full white grayscale FWG.

The voltage curve generator 1030 may generate the second converted voltage curve VCC2 and the additional converted voltage curves between the first converted voltage curve VCC1 and the second converted voltage curve VCC2 based on the first converted voltage curve VCC1.

A voltage of the second converted voltage curve VCC2 with respect to the peak grayscale PG may be greater than the voltage of the first converted voltage curve VCC1 with respect to the peak grayscale PG by the voltage drop amount VDA of the driving voltage ELVDD corresponding to the converted peak luminance PLC. A voltage of the second converted voltage curve VCC2 with respect to the full white grayscale FWG may be greater than the voltage of the first converted voltage curve VCC1 with respect to the full white grayscale FWG by the voltage drop amount VDA of the driving voltage ELVDD corresponding to the converted full white luminance FWLC. A voltage of the second converted voltage curve VCC2 with respect to the black grayscale BG may be equal to the voltage of the second converted voltage curve VCC2 with respect to the peak grayscale PG. Voltages of the second converted voltage curve VCC2 with respect to grayscales between the full white grayscale FWG and the peak grayscale PG may be generated by interpolating the voltage of the second converted voltage curve VCC2 with respect to the full white grayscale FWG and the voltage of the second converted voltage curve VCC2 with respect to peak grayscale PG. Voltages of the second converted voltage curve VCC2 with respect to grayscales between the black grayscale BG and the full white grayscale FWG may be generated by interpolating the voltage of the second converted voltage curve VCC2 with respect to the black grayscale BG and the voltage of the second converted voltage curve VCC2 with respect to the full white grayscale FWG.

Referring to FIGS. 7 and 14, the driving voltage controller 700 may generate the driving voltage ELVDD from the converted voltage curves VCC based on the load LD of the input image data IMD1 and the maximum gray scale value MGV of the input image data IMD1 (S1430). One converted voltage curve may be selected from the converted voltage curves VCC based on the load LD of the input image data IMD1, and one point may be selected from points of the selected converted voltage curve based on the maximum grayscale value MGV of the input image data IMD1. The driving voltage controller 700 may determine a voltage corresponding to the selected point as the driving voltage ELVDD, and may provide the determined driving voltage ELVDD to the display panel 110.

Figure 15:
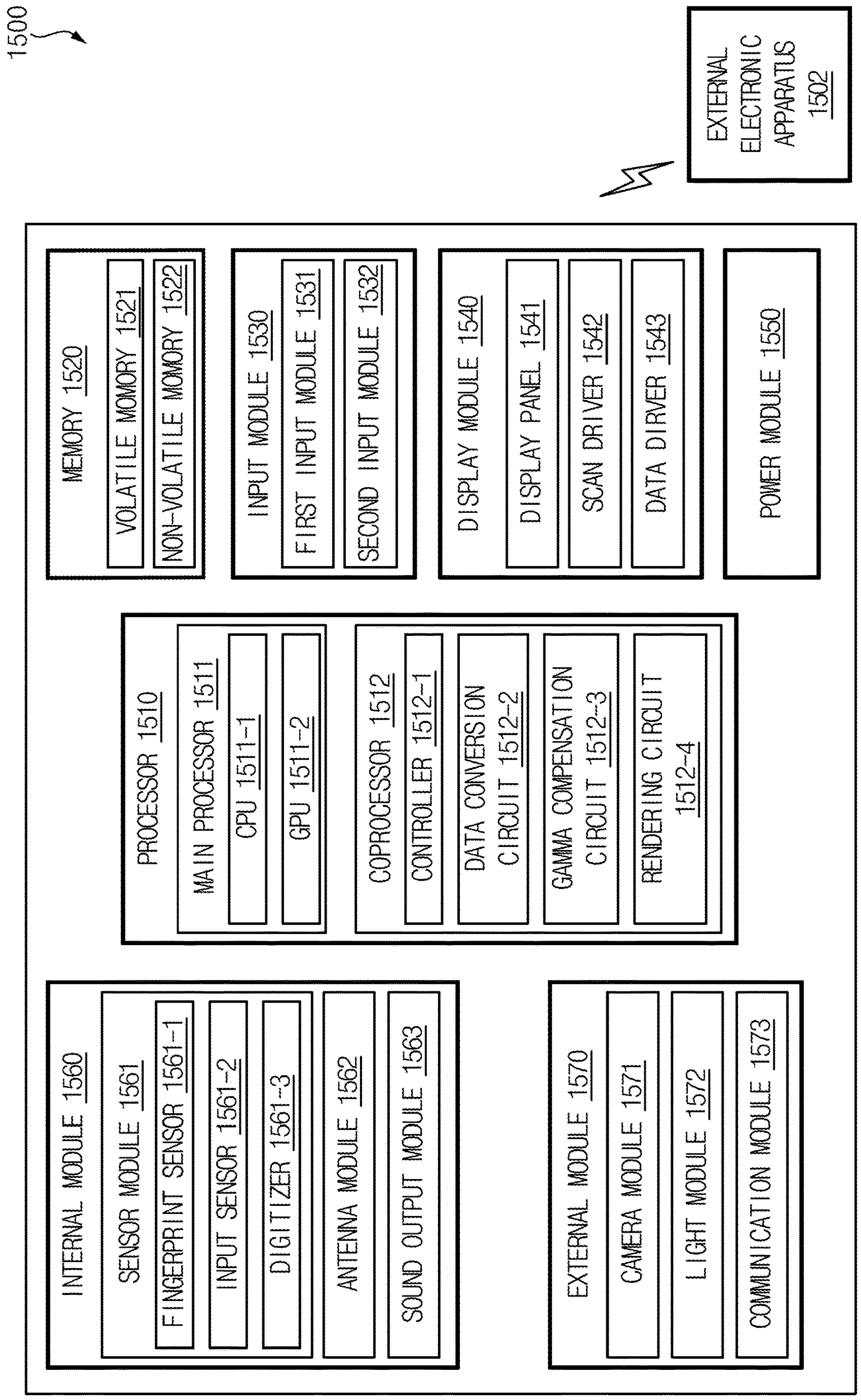
FIG. 15 is a block diagram illustrating an electronic apparatus according to an embodiment.

FIG. 15 is a block diagram illustrating an electronic apparatus 1500 according to an embodiment.

Referring to FIG. 15, the electronic apparatus 1500 may output information through a display module 1540. When a processor 1510 executes an application stored in a memory 1520, the display module 1540 may provide application information to a user through a display panel 1541.

The processor 1510 may obtain an external input through an input module 1530 or a sensor module 1561, and may execute an application corresponding to the external input. For example, when the user selects a camera icon displayed on the display panel 1541, the processor 1510 may obtain a user input through an input sensor 1561-2, and may activate a camera module 1571. The processor 1510 may transmit image data corresponding to a captured image acquired through the camera module 1571 to the display module 1540. The display module 1540 may display an image corresponding to the captured image through the display panel 1541. Some of components of the electronic apparatus 1500 may be integrated and provided as one component, and one component of the electronic apparatus 1500 may be provided separately as two or more components.

The electronic apparatus 1500 may communicate with an external electronic apparatus 1502 through a network (e.g., a short-range wireless communication network or a long-range wireless communication network). In an embodiment, the electronic apparatus 1500 may include the processor 1510, the memory 1520, the input module 1530, the display module 1540, a power module 1550, an internal module 1560, and an external module 1570. In an embodiment, in the electronic apparatus 1500, at least one of the above-described components may be omitted, or one or more other components may be added. In an embodiment, some of the above-described components (e.g., the sensor module 1561, an antenna module 1562, or a sound output module 1563) may be integrated into another component (e.g., the display module 1540).

The processor 1510 may execute software to control at least one other component (e.g., a hardware or software component) of the electronic apparatus 1500 connected to the processor 1510, and may perform various data processing or calculations. In an embodiment, as at least part of data processing or calculations, the processor 1510 may store commands or data received from other components (e.g., the input module 1530, the sensor module 1561, or a communication module 1573) in a volatile memory 1521, may process the commands or data stored in the volatile memory 1521, and resulting data may be stored in a non-volatile memory 1522.

The processor 1510 may include a main processor 1511 and a coprocessor 1512. The main processor 1511 may include one or more of a central processing unit ("CPU") 1511-1 or an application processor ("AP"). The main processor 1511 may further include any one or more of a graphic processing unit ("GPU") 1511-2, a communication processor ("CP"), and an image signal processor ("ISP"). At least two of the above-described processing unit and processor may be implemented as an integrated component (e.g., a single chip), or each may be implemented as an independent component (e.g., a plurality of chips).

The coprocessor 1512 may include a controller 1512-1. The controller 1512-1 may include an interface conversion circuit and a timing control circuit. The controller 1512-1 may receive an image signal from the main processor 1511, and may output image data by converting a data format of the image signal to meet interface specifications with the display module 1540. The controller 1512-1 may output various control signals necessary for driving the display module 1540.

The coprocessor 1512 may further include a data conversion circuit 1512-2, a gamma correction circuit 1512-3, a rendering circuit 1512-4, or the like. The data conversion circuit 1512-2 may receive image data from the controller 1512-1. The data conversion circuit 1512-2 may compensate the image data so that an image is displayed with desired luminance according to characteristics of the electronic apparatus 1500 or user settings, or may convert the image data to reduce power consumption or compensate for after-image. The gamma correction circuit 1512-3 may convert the image data or a gamma reference voltage so that an image displayed on the electronic apparatus 1500 has desired gamma characteristics. The rendering circuit 1512-4 may receive the image data from the controller 1512-1, and may render the image data in consideration of the pixel arrangement of the display panel 1541 applied to the electronic apparatus 1500. At least one of the data conversion circuit 1512-2, the gamma correction circuit 1512-3, and the rendering circuit 1512-4 may be integrated into another component (e.g., the main processor 1511) or a controller. At least one of the data conversion circuit 1512-2, the gamma correction circuit 1512-3, and the rendering circuit 1512-4 may be integrated into a data driver 1543 to be described below.

The memory 1520 may store various data used by at least one component (e.g., the processor 1510 or the sensor module 1561) of the electronic apparatus 1500, and input data or output data for commands related thereto. The memory 1520 may include at least one of the volatile memory 1521 and the non-volatile memory 1522.

The input module 1530 may receive commands or data to be used to components (e.g., the processor 1510, the sensor module 1561, or the sound output module 1563) of the electronic apparatus 1500 from the outside of the electronic apparatus 1500 (e.g., the user or the external electronic apparatus 1502).

The input module 1530 may include a first input module 1531 for receiving commands or data from the user and a second input module 1532 for receiving commands or data from the external electronic apparatus 1502. The first input module 1531 may include a microphone, a mouse, a keyboard, a key (e.g., a button), or a pen (e.g., a passive pen or an active pen). The second input module 1532 may support a specified protocol capable of connecting to the external electronic apparatus 1502 by wire or wirelessly. In an embodiment, the second input module 1532 may include a high definition multimedia interface ("HDMI"), a universal serial bus ("USB") interface, an SD card interface, or an audio interface. The second input module 1532 may include a connector that can be physically connected to the external electronic apparatus 1502, for example, an HDMI connector, a USB connector, an SD card connector, or an audio connector (e.g., a headphone connector).

The display module 1540 may provide visual information to the user. The display module 1540 may include a display panel 1541, a scan driver 1542, and the data driver 1543. The display module 1540 may further include a window, a chassis, and a bracket to protect the display panel 1541. The display module 1540 may correspond to the display device 100 in FIG. 1. The display panel 1541, the scan driver 1542, and the data driver 1543 may correspond to the display panel 110, the gate driver 120, and the data driver 130 in FIG. 1, respectively.

The power module 1550 may supply power to components of the electronic apparatus 1500. The power module 1550 may include a battery that charges a power voltage. The battery may include a non-rechargeable primary cell, a rechargeable secondary cell, or a fuel cell. The power module 1550 may include a power management integrated circuit ("PMIC"). The PMIC may supply optimized power to each of the above-described modules and modules to be described below. The power module 1550 may include a wireless power transmission/reception member electrically connected to the battery. The wireless power transmission/reception member may include a plurality of antenna radiators in the form of coils.

The electronic apparatus 1500 may further include the internal module 1560 and the external module 1570. The internal module 1560 may include the sensor module 1561, the antenna module 1562, and the sound output module 1563. The external module 1570 may include the camera module 1571, a light module 1572, and the communication module 1573.

The sensor module 1561 may detect an input by a user's body or an input by a pen among the first input module 1531, and may generate an electrical signal or data value corresponding to the input. The sensor module 1561 may include at least one of a fingerprint sensor 1561-1, an input sensor 1561-2, and a digitizer 1561-3.

The processor 1510 may output commands or data to the display module 1540, the sound output module 1563, the camera module 1571, or the light module 1572 based on the input data received from the input module 1530. For example, the processor 1510 may generate image data corresponding to input data applied through the mouse or the active pen and output the generated image data to the display module 1540, or may generate command data corresponding to the input data and output the generated command data to the camera module 1571 or the light module 1572. When input data is not received from the input module 1530 for a certain period of time, the processor 1510 may convert an operation mode of the electronic apparatus 1500 into a low power mode or a sleep mode so that power consumption of the electronic apparatus 1500 may be reduced.

The processor 1510 may outputs commands or data to the display module 1540, the sound output module 1563, the camera module 1571, or the light module 1572 based on sensing data received from the sensor module 1561. For example, the processor 1510 may compare authentication data applied by the fingerprint sensor 1561-1 with authentication data stored in the memory 1520, and then may execute an application according to the comparison result. The processor 1510 may execute a command or output corresponding image data to the display module 1540 based on the sensing data sensed by the input sensor 1561-2 or the digitizer 1561-3. When the sensor module 1561 includes a temperature sensor, the processor 1510 may receive temperature data for a temperature measured from the sensor module 1561, and may further perform luminance compensation on the image data based on the temperature data.

The display device according to the embodiments may be applied to a display device included in a computer, a notebook, a mobile phone, a smart phone, a smart pad, a PMP, a PDA, an MP3 player, or the like.

Although the display devices, the methods of driving the display devices, and the electronic apparatuses according to the embodiments have been described with reference to the drawings, the illustrated embodiments are examples, and may be modified and changed by a person having ordinary knowledge in the relevant technical field without departing from the technical spirit described in the following claims.

What is claimed is:

1. A display device, comprising:

a display panel which displays an image based on output image data which is converted input image data;

a voltage curve controller which generates a converted peak luminance, a converted full white luminance, a converted peak grayscale corresponding to the converted peak luminance, and a converted full white grayscale corresponding to the converted full white luminance from a reference peak luminance and a reference full white luminance based on a gain mode and a gain value, and generates converted voltage curves including a first converted voltage curve from a first reference voltage curve based on the converted peak grayscale and the converted full white grayscale, each of the converted voltage curves representing a voltage with respect to a grayscale; and a driving voltage controller which generates a driving voltage from the converted voltage curves based on a load of the input image data and a maximum grayscale value of the input image data, and provides the driving voltage to the display panel, wherein a voltage of the first converted voltage curve with respect to a peak grayscale is equal to a voltage of the first reference voltage curve with respect to the converted peak grayscale, and wherein the driving voltage controller selects one converted voltage curve among the converted voltage curves based on the load of the input image data which is a ratio of an average of grayscale values of the input image data to the maximum grayscale of the input image data.

2. The display device of claim 1, wherein a voltage of the first converted voltage curve with respect to a full white grayscale is equal to a voltage of the first reference voltage curve with respect to the converted full white grayscale.

3. The display device of claim 2, wherein a ratio of the full white grayscale to the converted full white grayscale is substantially equal to a ratio of the peak grayscale to the converted peak grayscale.

4. The display device of claim 2, wherein voltages of the first converted voltage curve with respect to grayscales between the full white grayscale and the peak grayscale are generated by interpolating the voltage of the first converted voltage curve with respect to the full white grayscale and the voltage of the first converted voltage curve with respect to the peak grayscale.

5. The display device of claim 2, wherein a voltage of the first converted voltage curve with respect to a black grayscale is equal to the voltage of the first converted voltage curve with respect to the peak grayscale.

6. The display device of claim 5, wherein voltages of the first converted voltage curve with respect to grayscales between the black grayscale and the full white grayscale are generated by interpolating the voltage of the first converted voltage curve with respect to the black grayscale and the voltage of the first converted voltage curve with respect to the full white grayscale.

7. The display device of claim 5, wherein the black grayscale and the peak grayscale are 0 grayscale and 255 grayscale, respectively.

8. The display device of claim 1, wherein the converted peak luminance is generated by multiplying the reference peak luminance by the gain value.

9. The display device of claim 1, wherein the converted full white luminance is equal to the reference full white luminance when the gain mode is a peak gain mode in which a luminance of the image decreases in a load range less than or equal to a predetermined load.

10. The display device of claim 1, wherein the converted full white luminance is generated by multiplying the reference full white luminance by the gain value when the gain mode is a dimming gain mode in which a luminance of the image decreases in an entire load range.

11. The display device of claim 1, wherein each of the first reference voltage curve and the first converted voltage curve represents a voltage with respect to a grayscale when the load of the input image data is a minimum load.

12. The display device of claim 11, wherein the converted voltage curves further include a second converted voltage curve representing a voltage with respect to a grayscale when the load of the input image data is a maximum load, and wherein the voltage curve controller generates the second converted voltage curve based on the first converted voltage curve.

13. A method of driving a display device, the method comprising:

generating a converted peak luminance, a converted full white luminance, a converted peak grayscale corresponding to the converted peak luminance, and a converted full white grayscale corresponding to the converted full white luminance from a reference peak luminance and a reference full white luminance based on a gain mode and a gain value;

generating converted voltage curves including a first converted voltage curve from a first reference voltage curve based on the converted peak grayscale and the converted full white grayscale, each of the converted voltage curves representing a voltage with respect to a grayscale; and generating a driving voltage from the converted voltage curves based on a load of input image data and a maximum grayscale value of the input image data, wherein a voltage of the first converted voltage curve with respect to a peak grayscale is equal to a voltage of the first reference voltage curve with respect to the converted peak grayscale, and wherein generating the driving voltage comprises selecting one converted voltage curve among the converted voltage curves based on the load of input image data which is a ratio of an average of grayscale values of the input image data to the maximum grayscale value of the input image data.

14. The method of claim 13, wherein a voltage of the first converted voltage curve with respect to a full white grayscale is equal to a voltage of the first reference voltage curve with respect to the converted full white grayscale.

15. The method of claim 14, wherein a ratio of the full white grayscale to the converted full white grayscale is substantially equal to a ratio of the peak grayscale to the converted peak grayscale.

16. The method of claim 14, wherein voltages of the first converted voltage curve with respect to grayscales between the full white grayscale and the peak grayscale are generated by interpolating the voltage of the first converted voltage curve with respect to the full white grayscale and the voltage of the first converted voltage curve with respect to the peak grayscale.

17. The method of claim 14, wherein a voltage of the first converted voltage curve with respect to a black grayscale is equal to the voltage of the first converted voltage curve with respect to the peak grayscale.

18. The method of claim 17, wherein voltages of the first converted voltage curve with respect to grayscales between the black grayscale and the full white grayscale are generated by interpolating the voltage of the first converted voltage curve with respect to the black grayscale and the voltage of the first converted voltage curve with respect to the full white grayscale.

19. An electronic apparatus, comprising:

a display device which outputs visual information; and a processor which provides input image data to the display device, wherein the display device includes:

a display panel which displays an image based on output image data which is converted input image data;

a voltage curve controller which generates a converted peak luminance, a converted full white luminance, a converted peak grayscale corresponding to the converted peak luminance, and a converted full white grayscale corresponding to the converted full white luminance from a reference peak luminance and a reference full white luminance based on a gain mode and a gain value, and generates converted voltage curves including a first converted voltage curve from a first reference voltage curve based on the converted peak grayscale and the converted full white grayscale, each of the converted voltage curves representing a voltage with respect to a grayscale; and a driving voltage controller which generates a driving voltage from the converted voltage curves based on a load of the input image data and a maximum grayscale value of the input image data, and provides the driving voltage to the display panel, wherein a voltage of the first converted voltage curve with respect to a peak grayscale is equal to a voltage of the first reference voltage curve with respect to the converted peak grayscale, and wherein the driving voltage controller selects one converted voltage curve among the converted voltage curves based on the load of the input image data which is a ratio of an average of grayscale values of the input image data to the maximum grayscale of the input image data.

20. The electronic apparatus of claim 19, wherein a voltage of the first converted voltage curve with respect to a full white grayscale is equal to a voltage of the first reference voltage curve with respect to the converted full white grayscale.

* * * * *